United States Patent [19]
Arrasmith et al.

[11] Patent Number: 5,993,069
[45] Date of Patent: Nov. 30, 1999

[54] LOW FRICTION SHIELDED BEARING ASSEMBLY

[75] Inventors: Paul E. Arrasmith; James W. Chester; Eugene H. Cole, all of Valparaiso, Ind.

[73] Assignee: Urschel Laboratories Incorporated, Valparaiso, Ind.

[21] Appl. No.: 09/291,275

[22] Filed: Apr. 14, 1999

Related U.S. Application Data

[60] Provisional application No. 60/081,742, Apr. 15, 1998.

[51] Int. Cl.$^6$ ............................. F16C 33/76; F16C 35/07
[52] U.S. Cl. ........................... 384/477; 384/536; 384/537
[58] Field of Search .................................. 384/477, 480, 384/488, 536, 537

[56] References Cited

U.S. PATENT DOCUMENTS

| | | |
|---|---|---|
| 3,897,988 | 8/1975 | Dickinson et al. .................. 384/537 X |
| 4,063,066 | 12/1977 | Nagoshi .............................. 384/536 X |
| 4,707,150 | 11/1987 | Graham .............................. 384/477 X |
| 4,854,751 | 8/1989 | Grassmuck et al. ................ 384/477 X |
| 5,125,755 | 6/1992 | Adler et al. ............................. 384/536 |

*Primary Examiner*—Thomas R. Hannon
*Attorney, Agent, or Firm*—Bacon & Thomas, PLLC

[57] ABSTRACT

A low friction shielded bearing assembly for supporting a machine shaft, for example a spindle shaft of a food cutting machine, includes a rolling element radial and thrust bearing subassembly containing ball or roller elements supported between inner and outer relatively rotatable bearing races with seal elements for retaining lubricant within the bearing subassembly. A flanged, fretting and corrosion resistant sleeve is fixed within the inner race of the bearing subassembly with the flange of the sleeve shielding an adjacent bearing seal against direct impingement by sprayed cleaning fluids. The sleeve also transmits radial and thrust loads to the inner race. The bearing subassembly is retained within an annular retainer that is adjustably attached to a machine frame to permit adjustment of the location of the rotational axis of a shaft supported by the bearing and to permit adjustment of the bearing location axially along the shaft and relative to the machine frame. A secondary journal bearing may be provided as a backup to the ball or roller bearing subassembly in the event of a failure of the rolling element bearing and also to enable alignment of a shaft during assembly and disassembly of the shaft relative to the bearing assembly. The journal bearing normally does not contact the shaft during normal operation of the bearing assembly.

21 Claims, 1 Drawing Sheet

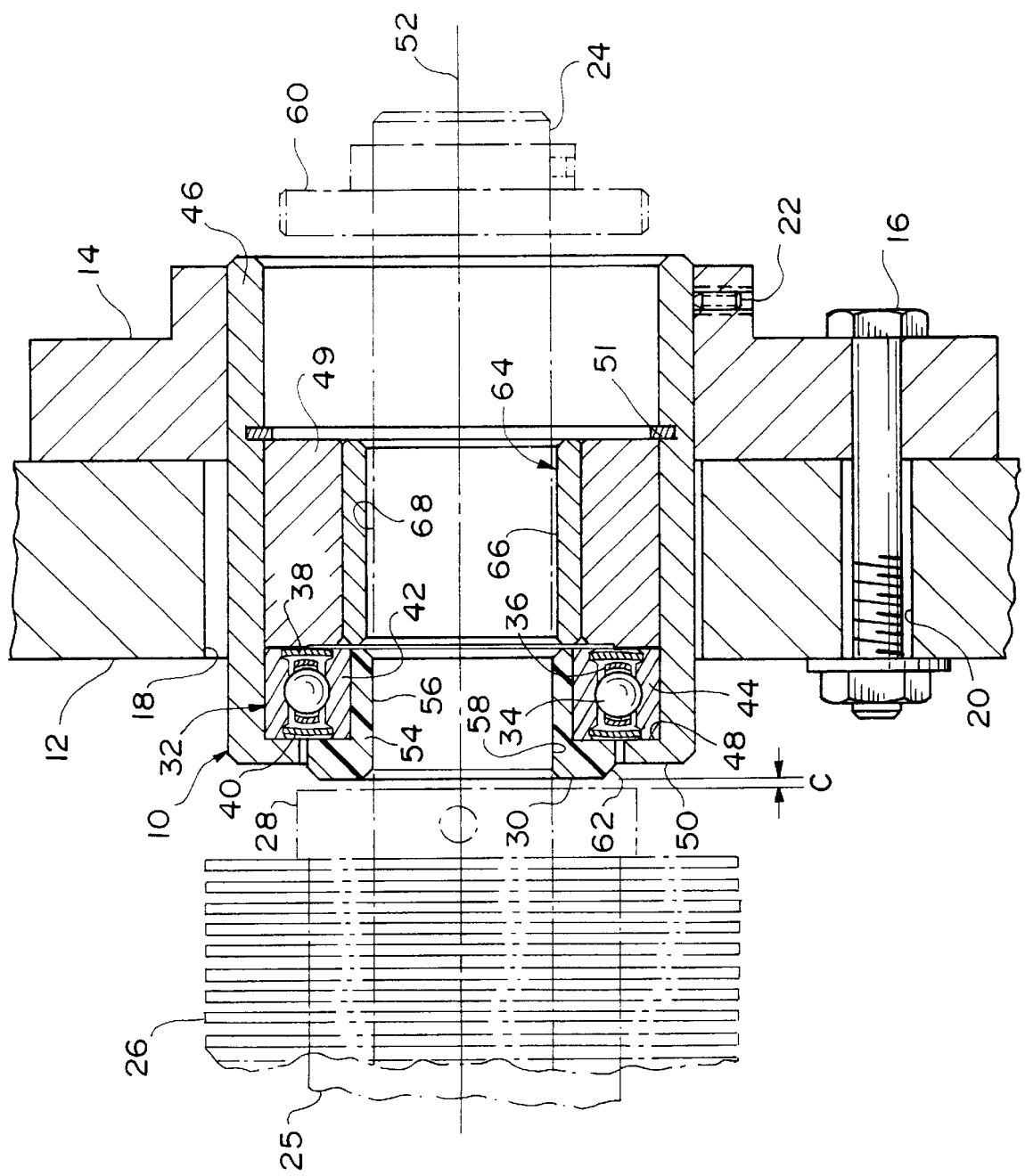

LOW FRICTION SHIELDED BEARING ASSEMBLY

This application claims Benefit to U.S. provisional application Ser. No. 60/081,742 filed Apr. 15, 1998.

BACKGROUND OF THE INVENTION

1. Field of the Invention

The invention relates to a low friction radial and thrust bearing assembly for rotationally supporting machine shafts relative to side frames of, for example, a food cutting machine.

2. Related Technology

Food cutting machines of various types are utilized to cut, slice, dice and otherwise reduce the size of larger food products into smaller size pieces that can be utilized by the food processing industry or other end users. One type of food cutting machine utilizes rotary disk blades mounted on a spindle that in turn is supported by a drive shaft that extends through side frames of the machine between which the spindle carrying the cutting blades is located.

The rotary cutting blades may cooperate with fixed stripper teeth extending between the blades requiring the blades to be precisely aligned between the stripper teeth with a minimum of side play. Other rotary cutting blades may be mounted on a spindle assembly and supported by a shaft or shafts extending through machine side frames wherein the blades likewise must be supported between the machine side frames with a minimum of end play between the ends of the cutter blade spindles and the side frames.

During operation of the cutting blades, the spindles and drive shaft or shafts supporting the spindles must be supported relative to the side frames by bearing assemblies that must accommodate both radial and thrust loads. The radial loads are imposed on the bearing assembly by the forces imposed on the shafts while the thrust loads are imposed on the bearing assemblies axially along the shafts by thrust plates or elements connected to the shaft between the shaft and the spindle adjacent the end frames of the machine. In accordance with prior art cutting machines, bronze bearing assemblies were utilized to provide a sliding journal bearing for the spindle shafts and the bearing assemblies included a fixed annular thrust load receiving surface for reacting thrust loads axially along the shaft adjacent the machine frame that were imposed on the bearing due to axial movement of the shaft and its associated blade carrying spindle. High friction loading was imposed on the thrust load receiving surfaces of such bearings, leading to failure of the bearings.

While lubrication schedules were specified by the manufacturer of such machines to maintain the bearing assemblies lubricated, frequent cleanings of the food cutting machinery utilizing high pressure sprays of cleaning fluid tended to remove lubricant from the bearing area which also resulted in premature bearing failure.

The bronze bearing assemblies in accordance with the prior art also resulted in higher friction drag on the rotating drive shafts due to the nature of the journal bearing surfaces, particularly when lubricant was scarce. Due to the open nature of the bronze type journal bearings used in accordance with the prior art, careful lubrication procedures were required to minimize flow of lubricant into the food cutting area. Although food grade lubricant is utilized in such bearings, modern standards for food preparation equipment tend to require minimum presence of lubricant in the food cutting area of such machines.

Early attempts to substitute a ball bearing assembly for the bronze journal bearings proved unsuccessful for a number of reasons. Primarily, fretting and corrosion problems between the outer periphery of the shafts and the inner race of the ball bearings lead to seizure between the shafts and the bearings that prevented axial removal of the shafts from the bearing assemblies. In food cutting machinery constructed in accordance with the prior art, removal of the shafts axially from the bearing assemblies is required to permit disassembly of the shafts, spindles and cutting blades during maintenance and repair operations. Due to the seizure problems, direct driving engagement between the shafts and the inner races of the bearings was impractical and there still remained the matter of reacting axial thrust loads imposed on the shaft into the inner race of the bearing assembly.

When standard sealed ball bearing assemblies were utilized, it was observed that high pressure cleaning sprays still penetrated the bearing seals which tended to remove lubricant from the bearings in spite of the presence of the sealed elements.

Thus, it became desirable to provide a low friction, shielded, sealed bearing assembly that could react radial and thrust loads while preventing direct impingement of cleaning sprays against the seal elements while minimizing thrust load friction at the bearing, and while avoiding fretting, corrosion and seizure problems between the shaft and bearing.

It also became highly desirable to provide a bearing assembly that could be readily adjustable within the machine frames both axially and radially to accommodate different shaft positions within the side frames and to permit precise adjustment of end play or clearances between the bearing thrust surfaces during set up of the shafts, cutting blades and spindles of the cutting machine.

BRIEF SUMMARY OF THE INVENTION

The present invention, in general terms, is a low friction radial and thrust bearing assembly utilizing rolling elements contained within a permanently lubricated sealed enclosure and supported by relative rotatable inner and outer bearing races. In accordance with the invention, the outer race is relatively fixed against rotation while the inner race is rotatable with a spindle shaft that extends axially through the bearing assembly.

The sealed bearings are supported within a bearing retainer housing that is connected to a respective machine side frame by an adjustable bearing holder that adjustably secures the housing and bearing assembly relative to the side frame.

A shield and thrust sleeve that is made of a material resistant to fretting and corrosion, for example, a plastic bearing material such as DELRIN™, available from E.I. duPont de Nemours, is concentrically fixed to the inner bearing race and is centered on the axis of rotation of the inner race. The sleeve includes an inner peripheral bearing surface that cooperates with the outer peripheral surface of a spindle shaft of a machine and rotates with the inner race of the bearing assembly. For example, the sleeve may be press fit or otherwise fixedly secured to the inner race of the bearing assembly.

The sleeve also includes a radially extending flange on one side of the sealed bearing that functions to transmit axial thrust loads into the inner race of the bearing assembly from the blade carrying spindle and also shields one of the bearing seals adjacent the spindle area against direct impingement thereon of cleaning fluids. The sleeve is arranged so that it rotates with the shaft whereby the shaft, sleeve and inner race of the bearing assembly rotate together.

Optionally, a secondary rotationally fixed journal bearing that does not normally contact the shaft periphery is located adjacent the rolling element bearing assembly so that, in the event of a failure of the latter, the journal bearing will provide a backup bearing surface for supporting the shaft radially close to its rotational axis and also react axial loads on the shaft in cooperation with the sleeve. For this purpose, the sleeve is aligned with the secondary journal bearing on the side of the sleeve facing away from the flange so that the journal will react limited thrust loads transmitted through the sleeve for a brief period of time, if necessary. The secondary journal bearing also helps to align and support the shaft during assembly and disassembly of the shaft axially through the bearing assembly.

Friction that occurs in the prior art fixed journal bearings resulting from axial thrust loads applied thereto is virtually eliminated because, in accordance with the bearing assembly of the invention, the thrust loads are applied and reacted by elements that rotate together, with the thrust loads being transmitted directly to the inner rotating race of the ball or roller bearing assembly. The use of a sleeve having desired properties for resisting seizure between the shaft and the inner race of the bearing avoids fretting and corrosion problems between the shaft and the bearing inner race. The radial flange of the sleeve covers and shields at least one of the exposed bearing seals against direct impingement by sprayed cleaning fluids during cleaning of the cutting machine to protect the lubricant contained in the bearing.

BRIEF DESCRIPTION OF THE DRAWINGS

The single drawing shows a preferred embodiment of a low friction shielded radial and thrust bearing assembly mounted in a frame of a food cutting machine and showing the relationship between the bearing assembly, machine frame and a spindle shaft of the cutting machine.

DETAILED DESCRIPTION OF A PREFERRED EMBODIMENT OF THE INVENTION

With reference to the drawing appended hereto, a bearing assembly 10 constructed in accordance with the present invention is fixedly secured in a fixed frame 12 of a food cutting machine or apparatus by means of an adjustable bearing assembly holder 14 that is mounted to the frame 12, for example by means of threaded fasteners 16 (only one fastener is illustrated in the drawing), the fasteners 16 being arranged to permit relative transverse displacement of the bearing assembly 10 within the axial aperture 18 extending through the frame 12. For example, a plurality of apertures 20 for receiving the threaded fasteners 16 may be provided in frame 12 at various spacings from aperture 18 or the apertures 20 may be oversized to permit displacement of the assembly holder 14 parallel with the frame 12. The purpose of this adjustment feature will become clear in the discussion that follows.

The adjustable assembly holder 14 also releasably engages the outer surface of bearing assembly 10, for example by means of a releasable set screw 22. Alternatively, and preferably, the holder 14 is split along a center line (not shown) so that it can releasably clamp the outer periphery of the bearing assembly 10 by opening and closing of the split clamp arrangement by means of a clamp fastener while the holder 14 is held fixed on the frame 12.

This arrangement permits the bearing assembly 10 to be adjusted in a direction parallel with the fixed frame 12 or transversely with respect to the frame 12 (left or right as illustrated) and secured at a new location to provide both axial adjustment of the bearing assembly 10 relative to a spindle shaft of the food cutting machine and radial adjustment of the bearing assembly 210, as will be described below.

The bearing assembly 10 preferably is intended for use in food cutting machinery that includes one or more rotatable spindle shafts carrying spindles supporting rotary cutting blades for reducing the size of various food products. One such spindle shaft 24 is illustrated in the drawing, shaft 24 carrying spindle 25 on which rotary cutting blades 26 are mounted. The spindle 25 and blades 26 are fixed on and rotate with the shaft 24. A thrust load transmitting element or member 28 is fixedly carried by spindle 25 or shaft between the cutting blades 26 and a thrust load receiving surface 30 of the bearing assembly 10 that will be described in more detail below.

It should be understood that the thrust load transmitting member 28, while illustrated as separate element, could be constituted of the end face of a stack of blades 26 mounted on the spindle 24 or any other suitable element or surface connected to shaft 24 that will provide the thrust transmitting function.

Bearing assembly 10 includes a sealed, lubricated rolling element radial and thrust bearing subassembly 32, preferably a sealed ball bearing device capable of reacting radial and thrust loads. The bearing 32 may comprise any conventional ball or roller type, low friction, permanently sealed bearing assembly, such assembly typically including ball or roller elements 34, a cage 36 for retaining the ball or roller elements 34 in spaced relationship, outer and inner seal elements 38, 40, respectively, an inner race 42 and an outer race 44.

The outer and inner seals 38, 40 typically are both fixedly secured to the outer or fixed race 44 and extend radially inwardly in close proximity with the adjacent surfaces of the inner or rotating race 42 to effectively seal lubricant within the chamber defined by the outer and inner seals 38, 40 and the inner and outer races 42, 44. A suitable bearing subassembly 32 is available under part No. SS-6007-2RS from Micro Miniature Bearing Co., 7 Jacoma Blvd., Old Bridge, N.J. 08857.

An annular bearing retainer 46 supports the ball or roller bearing subassembly 32 relative to the frame 12 in cooperation with the adjustable assembly holder 14 that releasably engages the outer peripheral surface of the retainer 46 in the manner illustrated and previously described.

The retainer 46 comprises an annular housing that includes a radially extending axial locating surface 48 preferably defined by an inwardly turned flange portion 50 of the retainer 46, whereby the bearing subassembly 32 may be axially located within the retainer 46 by urging the outer race 44 of the bearing subassembly 32 against the axial locating surface 48 by means of an appropriate securing structure. For example, in the preferred embodiment illustrated, a rigid spacer 49 made of metal and a snap ring 51 are located within the inner periphery of retainer 46 to secure the bearing subassembly 32 axially relative to the retainer 46. The retainer 46 also holds the relatively rotatable inner race 42 of the bearing subassembly 32 centered relative to rotational axis 52 of shaft 24. It will be observed that radial adjusting movement of the retainer 46 parallel to the frame 12 will adjust the location of the rotational axis 52 relative to the frame 12. This is desired to permit adjustment of the position of rotational axis 52 when different cutting blades 26 are mounted on the shaft 24.

To prevent direct contact between the shaft 24 and the inner race 42 of the bearing subassembly 32, a shield and thrust sleeve 54 is fixedly secured within the inner peripheral surface of inner race 42, for example by a press fit relationship. Thus, sleeve 54 always rotates with the inner race 42 between shaft 24 and the inner race 42. By proper selection of materials for the sleeve 54, the usual fretting, corrosion and seizing problems normally encountered between a shaft 24 and an inner race 42 of a roller or ball bearing subassembly 32 is avoided while still maintaining a radial and thrust load reacting function between the shaft 24, thrust load transmitting member 28 and the inner race of the bearing subassembly 32. Preferably, the material forming sleeve 54 will be selected from those materials that avoid fretting and corrosion between the outer periphery of shaft 24 and the inner peripheral surface 56 of sleeve 54. Preferably, sleeve 54 is made of a molded bearing plastic material supplied under the tradename DELRIN™ by E.I. duPont de Nemours. Other materials could be utilized, provided that they exhibit suitable strength, friction and wear characteristics appropriate for transmitting radial and axial loads into the inner race 42 of the bearing subassembly via shaft 24 and thrust load transmitting member 28.

The inner peripheral surface 56 of the sleeve 54 is dimensioned so that it fits very closely on an outer first bearing cooperating surface 58 of shaft 24. The outer bearing cooperating surface 58 fits sufficiently snugly within the inner surface 56 of sleeve 54 such that the sleeve 54 rotates with the shaft 24 during operation of the cutting machine while still permitting axial withdrawal or insertion of the shaft through the bearing inner race. The various radial forces exerted by shaft 24 on sleeve 54 also ensure that the sleeve 54 rotates with the shaft 24. Thus, shaft 24, sleeve 54 and inner race 42 of bearing subassembly 32 rotate as a unit during operation of the cutting machine.

Shaft 24, for example, may be driven by a gear element 60 fixedly secured to the shaft 24 and which may receive driving torque from a suitable power transmission source, for example a cogged belt or gearing.

Sleeve 54 also includes a radially extending flange portion 62 that extends radially relative to the axis of rotation 52 on one side of the bearing subassembly (the side toward the spindle) to an extent sufficient to overlie the juncture between the inner seal element 40 and the inner race 42. Preferably, the flange 62 closely approaches inwardly extending flange portion 50 of the holder 46 so as to define a small gap, for example 0.45 in. (0.114 cm) between the outer periphery of the flange 62 of the sleeve 54 and the inwardly extending flange 50 of the holder 46. The thrust load receiving surface 30 is defined by a radially extending end wall on the flange 62 and is located closely adjacent the thrust load transmitting member 28, preferably separated by a clearance C, as illustrated. The clearance C may be on the order of 0.004 in (0.01 cm) up to 0.010 in. (0.025 cm) depending on the precision required to align the cutter blades within the frame elements 12 or stripper teeth (not shown). The clearance typically shows minimum axial movement of the spindle 25 and shaft 26 between thrust receiving surfaces 30 of opposed bearing assemblies 10, while accommodating axial thermal expansion of the shaft and rotating elements.

In practice, the shaft 24 extends between a pair of fixed frame elements 12 of a cutting machine and a bearing assembly 10 is located in each frame element at each end of the shaft 24 along with an assembly holder 14, whereby the end play in the shaft 24 can be adjusted on opposites sides of the spindle 25 to maintain the cutting blades in a precise axial relationship between the frame elements so they properly cooperate with mating blades, other surfaces or fixed stripper elements extending between the blades. However, axial loads extending along the shaft 24 transmitted by the thrust load transmitting member 28 can be reacted by the rotating thrust load receiving surface 30 which transmits the axial load directly into the inner race 42 of the bearing assembly 32 via the flange 62 of the sleeve 54.

The flange 62 of sleeve 54 provides the additional function of shielding the inner seal element 40 from direct impingement of cleaning liquids or fluid approaching the bearing subassembly 32 from the direction of the flange 62. Thus, liquid cleaning agents applied by pressure spraying in the area of the blades 26 will not directly impact the area between the inner seal 40 and its juncture with the inner race 42 to thereby minimize leakage of cleaning fluid into the bearing subassembly or leaching out of lubricant from within the sealed bearing subassembly. The spacer 49, as illustrated, has a similar protective function with respect to the outer seal element 38, although it will be obvious that it is the inner seal 40 that is of primary concern when the machine is being cleaned due to its proximity to the cutting blades 26.

It is typically desired to remove shaft 24 from the spindle 25 and bearing assembly 10 by releasing suitable fastening elements and withdrawing the shaft 24 axially through the sleeve 54 and bearing retainer 46. To facilitate this movement of the shaft 24 and also to provide an emergency bearing function in the event of failure of the rotary bearing element 32, a secondary journal bearing element 64 having an internal peripheral journal bearing surface 66 is located in axially spaced relationship relative to sleeve 54 on the side thereof opposite the flange 62. The journal bearing element 64 preferably is fixedly secured within spacer 49, for example by a press fit relationship. Any appropriate arrangement, of course, can be utilized to retain the journal bearing element 64 in a position that is centered relative to the rotational axis 52 of spindle 54. The journal bearing element 64 preferably is made of a composite graphite material available under the tradename GRAPHALLOY from Graphite Metalizing Corporation, 1050 Nepperhan Avenue, P.O. Box 110, Yonkers, N.Y. 10702.

The inner diameter of the journal bearing surface 66 is slightly larger than the inner diameter of the sleeve inner peripheral surface 56 and slightly larger than the outer diameter of shaft 24 at the location where it extends through the journal bearing element 64. The outer surfaces of shaft 24 at the locations where the shaft extends through the sleeve 54 and the journal bearing 64 can be formed as outer bearing cooperating surfaces whereby the outer periphery of the shaft 24 frictionally engages the inner periphery 56 of sleeve 54 and is slightly spaced from the inner periphery 66 of the journal bearing surface 66, for example, by a few thousandths of an inch, during normal operation of the bearing assembly. However, in the event of a failure of the roller or ball bearing subassembly 32, the journal bearing element 64 would function as a sliding journal bearing upon slight radial displacement of the shaft 24 at least until the cutting machine could be shut off to avoid catastrophic failure at the location of the cutter blades.

When the shaft 24 is removed from the spindle 25 and blades 26 and from the bearing assembly 10 by axial withdrawal of the shaft 24 through the bearing assembly 10 (for example towards the right as shown in the drawing), upon the clearance of the leftward end of the shaft 24 (not illustrated) with the sleeve 54, the left end of the shaft 24 can be momentarily carried and guided by the journal bearing peripheral surface 66 of the journal bearing element 64 so that the shaft 24 is guided during its axial movement for a longer distance. Upon insertion of the shaft 24 back through the bearing assembly 10, the journal bearing 64 and in particular the inner surface 66 of the journal bearing helps to guide the end of the shaft 24 into alignment with the sleeve 54 to assist in re-assembly of the shaft 24 through the bearing assembly 10, the spindle 25 and the blades 26. Normally, the spindle 25 and blades 26 will be retained temporarily in a concentric position relative to the rotational axis 52 by an appropriate fixture while the shaft 24 is inserted back through the spindle.

Thus, it will be seen that the bearing assembly 10 and the holder 14 provide full adjustment of the ball bearing subassembly 32, the journal bearing 64 and the shield and thrust sleeve 54 axially relative to the shaft 24 and also permit transverse adjustment of the position of the rotational axis 52 of shaft 24 relative to the frame 12 of the cutting machine.

The rotating fretting and corrosion resistant sleeve 54 provides the additional function of transmitting radial and thrust loads to the inner race 42 of the bearing subassembly 32 while the flange 62 of the sleeve protects the inner seal 40 of the bearing subassembly 32 from direct impingement of sprayed fluid cleaning materials.

Since all axial thrust loads transmitted along the shaft 24 are transmitted by two rotating thrust load receiving surfaces 30 at opposed ends of each shaft 24, friction is virtually eliminated between the rotating thrust load transmitting members 28 and the bearing subassembly 32.

If the bearing assembly 10 is intended for use in a food processing machine, all materials and lubricants utilized must be approved for food contact in accordance with known specifications.

In an alternate embodiment of the invention, the spacer 49 and the secondary journal bearing 64 may be eliminated, leaving the bearing subassembly 32 and the sleeve 54 within the retainer 46, which may have a shorter length. The bearing subassembly 32 may be secured in the retainer 46 by an appropriate snap ring or other fastener within the retainer 46 at an axially located position.

While the invention has been described in the context of a food cutting machine, it will be apparent that the bearing assembly could be used in any type of machine where a bearing assembly must be provided to support a rotary shaft under harsh operating conditions requiring shielding of a bearing seal and avoidance of seizure between the shaft and the inner race of the bearing. While many of the elements constituting the invention have been described in accordance with their preferred embodiments, it is to be understood that the invention can be embodied in various ways. Where elements have been described as a solid, single piece, it is possible to produce such an element in multiple pieces connected together by appropriate devices. The various fastener elements described could be substituted by any appropriate fastener device known to those skilled in the art. The various dimensional relationships described could be varied by a person skilled in the art without departing from the scope of the invention. Accordingly, the illustrated embodiment is intended to be exemplary only and not limiting in any manner.

We claim:

1. A low friction shielded bearing assembly comprising:
   a sealed rolling element radial and thrust bearing including an assembly of rolling elements between relatively rotatable inner and outer annular bearing races and a lubricant seal extending between the races, the lubricant seal including at least one seal portion fixedly secured to the outer bearing race and extending radially into close proximity with the inner bearing race on one side of said rolling elements;
   said inner bearing race including an inner peripheral surface centered about an axis of rotation;
   a retainer engaging and holding the outer bearing race against rotation;
   a shield and thrust sleeve concentrically fixedly secured to and coextensive with the inner bearing race inner peripheral surface, the sleeve including a sleeve inner peripheral surface adapted to receive an outer diameter of a rotary shaft to be supported by the bearing assembly in close fitting relationship;
   said sleeve including a flange located to one side of the bearing assembly and extending radially relative to said axis of rotation to a position whereat the flange overlies at least the juncture between the at least one seal portion and the inner bearing race in close proximity to said at least one seal portion, said flange including a radially extending thrust load receiving surface on the side of the flange opposite the bearing assembly;
   whereby said sleeve rotates with the inner bearing race relative to the outer bearing race and outer seal portion, transmits rotary motion, axial thrust loads and radial loads to the inner bearing race and shields at least the juncture between the outer seal portion and the inner race from direct impingement of fluid approaching the outer seal portion from the direction of the flange location.

2. The bearing assembly according to claim 1, wherein said retainer comprises an axially extending annular housing and at least one axial locating surface for axially locating the bearing outer race in the housing.

3. The bearing assembly according to claim 2, said shield and thrust sleeve inner peripheral surface having a first inner diameter;
   an annular journal bearing retained in said retainer housing and fixed against rotation relative to the housing, said journal bearing including an inner annular bearing surface having a second inner diameter greater than said first inner diameter and centered about said axis of rotation;
   said journal bearing disposed adjacent the side of said radial and thrust bearing opposite the side thereof on which said sleeve flange is located.

4. The bearing assembly according to claim 3, wherein said annular housing includes an inner peripheral surface larger in radial size than said journal bearing, and including an annular spacer element secured in said housing between said journal bearing and the housing inner peripheral surface; said journal bearing fixedly secured to said spacer.

5. The bearing assembly according to claim 4, including a second seal portion fixedly secured to the outer bearing race and extending into close proximity with the inner bearing race, said second seal portion located towards the side of said rolling elements that is opposed to the side toward which the at least one seal portion is located;
   said spacer element overlying the juncture between said second seal portion and said inner bearing race.

6. The bearing assembly according to claim 2, wherein said axial locating surface extends radially inwardly over at least a part of said at least one seal portion and in close proximity with a radial periphery of said flange.

7. The bearing assembly according to claim 1, wherein said radial and thrust bearing assembly comprises a sealed lubricated ball bearing assembly.

8. The bearing assembly according to claim 1, wherein said shield and sleeve is formed of a non-metallic material resistant to fretting and corrosion in an operational environment of the bearing assembly.

9. The bearing assembly according to claim 8, wherein said shield and thrust sleeve is formed of a plastic bearing material.

10. A low friction shielded bearing assembly for supporting a machine shaft against radial and axial thrust loads, comprising:

a rotatable machine shaft including a first outer bearing cooperating surface on one portion thereof, said first outer bearing cooperating surface having an outer diameter;

a thrust load transmitting member connected to the shaft for rotation therewith and including a radially extending thrust load applying surface;

a sealed rolling element radial and thrust bearing including an assembly of rolling elements between relatively rotatable inner and outer annular bearing races and a lubricant seal extending between the races, the lubricant seal including at least one seal portion fixedly secured to the outer bearing race and extending radially into close proximity with the inner bearing race on one side of said rolling elements;

said inner bearing race including an inner peripheral surface centered about an axis of rotation;

a retainer engaging and holding the outer bearing race against rotation;

a shield and thrust sleeve concentrically fixedly secured to and coextensive with the inner bearing race inner peripheral surface, the sleeve including a sleeve inner peripheral surface;

said sleeve including a flange located to one side of the bearing assembly and extending radially relative to said axis of rotation to a position whereat the flange overlies at least the juncture between the at least one seal portion and the inner bear race in close proximity to said at least one seal portion, said flange including a radially extending thrust load receiving surface on the side of the flange opposite the bearing assembly;

said machine shaft first outer bearing cooperating surface located concentrically within said sleeve inner peripheral surface in close fitting relationship and arranged to rotate with said sleeve;

said thrust load applying surface of said thrust load transmitting member located adjacent the thrust load receiving surface of said flange.

11. The bearing assembly according to claim 10, wherein said retainer comprises an axially extending annular housing and at least one axial locating surface for axially locating the bearing outer race in the housing.

12. The bearing assembly according to claim 11, said shield and thrust sleeve inner peripheral surface having a first inner diameter;

an annular journal bearing retained in said retainer housing and fixed against rotation relative to the housing, and including an inner annular bearing surface having a second inner diameter greater than said first inner diameter centered about said axis of rotation;

said journal bearing disposed adjacent the side of said radial and thrust bearing opposite the side thereof on which said seal flange is located;

said shaft having a second bearing cooperating surface extending through said inner annular bearing surface, said second bearing cooperating surface being smaller in diameter than said second inner diameter of said inner annular bearing surface.

13. The bearing assembly according to claim 12, wherein said first and second bearing cooperating surfaces of said shaft have the same diameter.

14. The bearing assembly according to claim 12, wherein said retainer includes an inner peripheral surface larger in radial size than said journal bearing, and including an annular spacer element secured in said housing between said journal bearing and the housing inner peripheral surface; said journal bearing fixedly secured to said spacer.

15. The bearing assembly according to claim 14, including a second seal portion fixedly secured to the outer bearing race and extending into close proximity with the inner bearing race, said second seal portion located towards the side of said rolling elements that is opposed to the side toward which the at least one seal portion is located;

said spacer element overlying the juncture between said second seal portion and said inner bearing race.

16. The bearing assembly according to claim 11, wherein said axial locating surface extends radially inwardly over at least a part of said at least one seal portion and in close proximity with a radial periphery of said flange.

17. The bearing assembly according to claim 11, including an adjustable bearing assembly holder engaging the retainer, said holder including an axial adjustment device enabling axial position adjustment of the retainer relative to the shaft when the shaft is substantially axially fixed.

18. The bearing assembly according to claim 17, including a fixed machine frame element;

said shaft extending through said frame element said holder including a radial adjustment device enabling radial adjustment of the retainer, bearing assembly and shaft relative to the machine frame element.

19. The bearing assembly according to claim 10, wherein said radial and thrust bearing assembly comprises a sealed lubricated ball bearing assembly.

20. The bearing assembly according to claim 10, wherein said shield and thrust sleeve is formed of a non-metallic material resistant to fretting and corrosion in an operational environment of the bearing assembly.

21. The bearing assembly according to claim 20, wherein said shield and thrust sleeve is formed of a plastic bearing material.

* * * * *